(12) United States Patent  (10) Patent No.: US 9,307,127 B2
Masuda et al.  (45) Date of Patent: Apr. 5, 2016

(54) IMAGE CAPTURING DEVICE AND IMAGE CAPTURING SYSTEM

(71) Applicants: Kensuke Masuda, Kanagawa (JP); Yuji Yamanaka, Kanagawa (JP); Go Maruyama, Kanagawa (JP)

(72) Inventors: Kensuke Masuda, Kanagawa (JP); Yuji Yamanaka, Kanagawa (JP); Go Maruyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 13/960,067

(22) Filed: Aug. 6, 2013

(65) Prior Publication Data

US 2014/0078379 A1 Mar. 20, 2014

(30) Foreign Application Priority Data

Sep. 14, 2012 (JP) .................................. 2012-203301
Jul. 12, 2013 (JP) .................................. 2013-145983

(51) Int. Cl.
| | |
|---|---|
| *G01N 21/25* | (2006.01) |
| *H04N 5/225* | (2006.01) |
| *H04N 9/04* | (2006.01) |
| *G01J 3/28* | (2006.01) |
| *G02B 3/00* | (2006.01) |
| *G01J 3/12* | (2006.01) |
| *G01J 3/02* | (2006.01) |

(52) U.S. Cl.
CPC ............ *H04N 5/2254* (2013.01); *G01J 3/2823* (2013.01); *H04N 9/045* (2013.01); *G01J 3/0208* (2013.01); *G01J 2003/1213* (2013.01); *G01J 2003/2826* (2013.01); *G02B 3/0006* (2013.01)

(58) Field of Classification Search
CPC ....... H04N 13/0214; G03B 35/08; G01J 3/36; G01J 3/2823; G01J 2003/2826; G01J 2003/1213
See application file for complete search history.

(56) References Cited

U.S. PATENT DOCUMENTS

| | | | | |
|---|---|---|---|---|
| 5,005,968 | A | * | 4/1991 | Tejima et al. .................. 353/122 |
| 5,246,803 | A | * | 9/1993 | Hanrahan et al. .................. 430/7 |
| 5,729,011 | A | * | 3/1998 | Sekiguchi ..................... 250/226 |
| 7,433,042 | B1 | | 10/2008 | Cavanaugh et al. |

(Continued)

FOREIGN PATENT DOCUMENTS

| | | |
|---|---|---|
| CN | 1677217 A | 10/2005 |
| CN | 102215329 A | 10/2011 |

(Continued)

OTHER PUBLICATIONS

Combined Chinese Office Action and Search Report issued Mar. 24, 2015 in Patent Application No. 201310379230.9 (with English Translation of Category of Cited Documents).

(Continued)

*Primary Examiner* — Michael A Lyons
(74) *Attorney, Agent, or Firm* — Oblon, McClelland, Maier & Neustadt, L.L.P (57) ABSTRACT

An image capturing device and an image capturing system are provided. The image capturing device includes an optical system, a first filter provided near a diaphragm position of the optical system, a sensor, and a lens array. The first filter includes a plurality of filters respectively having different spectral characteristics. The sensor includes a plurality of filters respectively having different spectral characteristics. The lights from an object pass through the respective filters of the first sensor and the respective filters of the second sensor to simultaneously form a plurality of types of spectral image of the object on an image plane of the sensor.

15 Claims, 8 Drawing Sheets

(56) References Cited

U.S. PATENT DOCUMENTS

| | | | |
|---|---|---|---|
| 2005/0162600 A1* | 7/2005 | Rho et al. | 349/139 |
| 2006/0044427 A1* | 3/2006 | Hu | 348/266 |
| 2011/0164156 A1 | 7/2011 | Hiramoto et al. | |
| 2012/0127351 A1* | 5/2012 | Vlutters et al. | 348/266 |
| 2012/0133743 A1* | 5/2012 | Hiramoto et al. | 348/46 |
| 2012/0226480 A1* | 9/2012 | Berkner et al. | 703/1 |

FOREIGN PATENT DOCUMENTS

| | | |
|---|---|---|
| CN | 102472664 A | 5/2012 |
| CN | 102474648 A | 5/2012 |
| JP | 6-018329 | 1/1994 |
| JP | 2001022930 A * | 1/2001 |
| JP | 2001-099710 | 4/2001 |
| JP | 2001-296180 | 10/2001 |
| JP | 2004-093286 | 3/2004 |
| JP | 2005-345130 | 12/2005 |
| WO | WO 2011/151948 * | 8/2011 ............ H04N 9/07 |

OTHER PUBLICATIONS

Office Action mailed Nov. 19, 2015 in Chinese Patent Application No. 201310379230.9.

* cited by examiner

IMAGE CAPTURING DEVICE AND IMAGE CAPTURING SYSTEM

CROSS-REFERENCE TO RELATED APPLICATIONS

This patent application is based on and claims priority pursuant to 35 U.S.C. §119 to Japanese Patent Application Nos. 2012-203301 filed on Sep. 14, 2012, and 2013-145983 filed on Jul. 12, 2013, in the Japan Patent Office, the entire disclosure of which is hereby incorporated by reference herein.

BACKGROUND

1. Technical Field

The present invention relates to an image capturing device that obtains spectral information from an object, and an image capturing system provided with the image capturing device.

2. Description of the Related Art

The spectral reflectance or the state of the object may be obtained through evaluating the spectral information of the object, which may be measured using a spectrometer such as a prism, grating, or liquid crystal tunable filter. While a spectrum of a point or a line of the object can be measured at once using the spectrometer, a surface of the object is usually measured by scanning the object using a linear spectrometer. Especially when the object is a moving object, such as a cell, measuring the spectrum of the object surface with improved accuracy has been difficult.

Japanese Patent Application Publication No. JP2001-99710-A discloses a method of estimating a spectrum of an object from a multi-band image, which is generated based on a plurality of original images each being captured using a wavelength variable filter. More specifically, the wavelength variable filter is used to change a wavelength range corresponding to each channel to obtain a plurality of original images of the object. The spectrum of the object is estimated using the multi-band image generated based on the plurality of original images. Since switching of the wavelength range is required, a spectral image of the plurality of channels cannot be measured at once. Assuming that the number of channels is equal to or greater than 10, the channel of the wavelength variable filter needs to be changed for 10 times or more to obtain a band image for each channel, thus requiring processing time. Especially when the object is a moving object, the accuracy in measuring the spectrum may greatly suffer.

SUMMARY

Example embodiments of the present invention include an image capturing device, and an image capturing system provided with the image capturing device. The image capturing device includes an optical system, a first filter provided near a diaphragm position of the optical system, a sensor, and a lens array. The first filter includes a plurality of filters respectively having different spectral characteristics. The sensor includes a plurality of filters respectively having different spectral characteristics. The lights from an object pass through the respective filters of the first sensor and the respective filters of the second sensor to simultaneously form a plurality of types of spectral image of the object on an image plane of the sensor.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Figure 1:
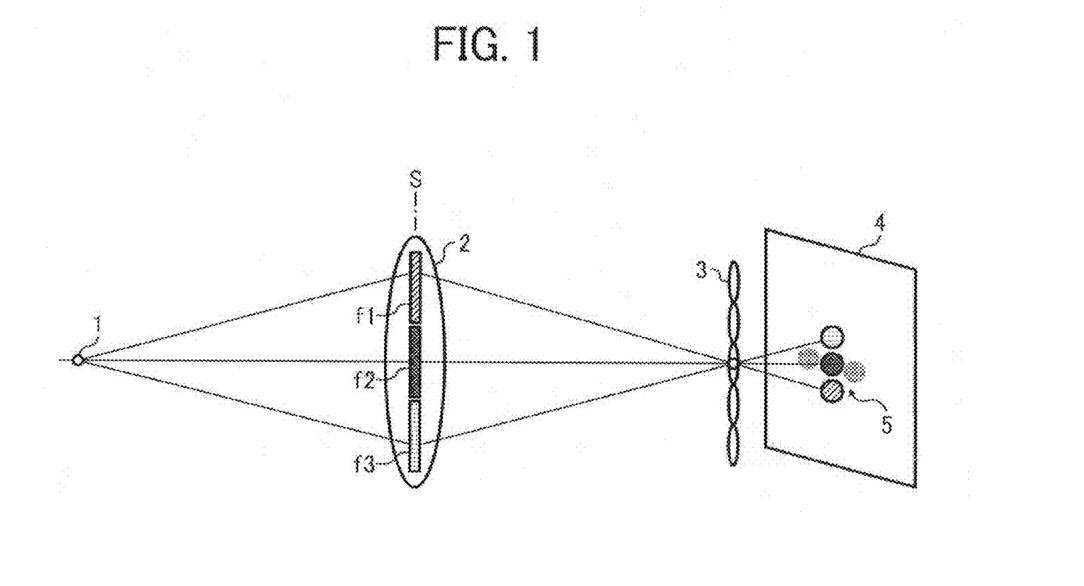
FIG. 1 is an illustration for explaining the theory of image capturing, using the background image capturing device.

Referring now to FIG. 1, the theory of image capturing is explained using an optical system 2 as an example. In this example, the optical system 2 includes a single lens (may be referred to as the "main lens") having a diaphragm position S along the center line. Along the center line of the main lens 2, three filters f1 (Red), f2 (Green), and f3 (Blue) are provided, which together function as a first filter array. For simplicity, FIG. 1 illustrates the filters f1 to f3 as they are positioned inside the lens 2 in FIG. 1. It is to be noted that the actual positions of the filters are not within the lens, but near the lens.

Still referring to FIG. 1, a micro-lens array (MLA) 3 is provided near an image plane 4 at which lights from the main lens 2 are focused. The image plane 4 has a sensor 5, which may be implemented by a monochrome sensor. More specifically, if a color sensor is used, information from a plurality of filters at the sensor 5 may not match with information obtained from the MLA 3, thus making difficult to detect spectral characteristics. In view of this, a monochrome sensor is usually used, for example, as described in U.S. Pat. No. 7,433,042-B1.

The lights from an arbitrary point 1 of an object enters at the respective positions of the main lens 2, and pass through the filters f1 to f3 that respectively have different spectral characteristics according to their positions. The lights passing through the filters are focused at the MLA 3. The MLA 3 irradiates the lights at the respective positions of the sensor 5. The lights, diffused from the point 1 of the object, and respectively having different spectral characteristics, are irradiated at different positions on the sensor 5. The image formed on the sensor 5 thus have spectral information of a plurality of types for that point 1 of the object.

In a substantially similar manner, lights diffused from a point of the object, which is different than the arbitrary point 1 as described above, are irradiated onto different positions on the sensor 5 to form an image indicating spectral information of a plurality of types for that point of the object. Through image processing, the plurality of types of spectral information of the object 1, which are obtained as described above for more than one point of the object 1, is organized according to the spectral characteristics, thus simultaneously generating a two-dimensional image indicating different spectral characteristics.

Based on this principle, by providing a plurality of filters such as band-pass filters near the diaphragm position S of the main lens 2, the two-dimensional image indicating different spectral characteristics of the object can be instantly measured. In this example, the position near the diaphragm position S not only includes the diaphragm position S, but also the position through which lights pass at various angles of view.

In order to measure a spectrum of an object found in nature, a sufficient number of band-pass filters are required to capture the images of six or more bands. Accordingly, six or more band-bass filters having different spectral characteristics need to be arranged near the diaphragm position S of the main lens 2, to obtain spectral information of six or more types. If the filters having different spectral characteristics are to be arranged near the diaphragm position S that is relatively small in aperture size, the arrangement of the filters needs to be precise, thus increasing the manufacturing cost of an image capturing device.

To improve the accuracy in arrangement, a plurality of filters may be unitarily formed into one filter unit. This, however, may cause the boundary between the filters to shield the light from the object, such that it may reduce the amount of light to be received as the boundary area increases due to the increased number of filters.

In view of the above, a filter may be provided between the MLA and the sensor. This layout does not require so much preciseness in arrangement of the filter, as the filter is not provided near the diaphragm position of the main lens 2. However, the increased number of filters may cause reduction in the amount of receiving lights or lowering of resolution.

Figure 9:
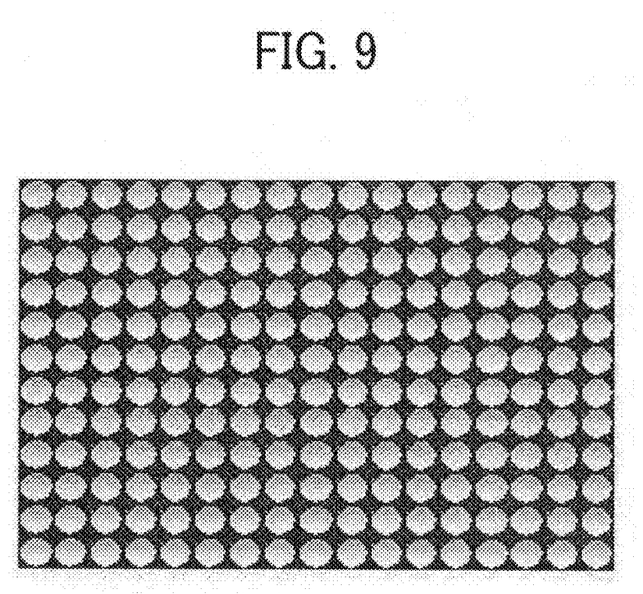
FIG. 9 is an illustration of an example image captured by an image capturing device using the background technology.

FIG. 9 illustrates an example image captured by the background image capturing device. The macro-pixels, represented by small circles, are arranged in a corresponding manner with the diaphragm size of the main lens 2. These macro-pixels together form a single image. With the increased number of filters, light information corresponding to the divided number of filters enters within one macro-pixel, such that light information of a pixel corresponding to one filter at the sensor tends to be small. The increased size of the macro-pixel may increase the amount of light information, which may result in lower resolution.

In view of this, it is desired to provide an image capturing device, which simultaneously obtains a plurality of types of spectral information without increasing the number of filters, while suppressing various problems such as the increase in manufacturing cost to keep precise arrangement of filters, the reduction in light amount, and the reduction in resolution.

In view of this, in this example, a three-color color sensor is used. Further, three filters of different types are arranged near the diaphragm position S. With this configuration, the number of filters to be arranged near the diaphragm position S is reduced, while obtaining spectral information of six or more bands. More specifically, a plurality of types of spectral characteristics of the filters at the color sensor, and a plurality of types of spectral characteristics of the filters at the optical system such as the main lens, are made different from one another to generate a plurality of patterns of combination of spectral characteristics. With this combination pattern in spectral characteristics for the filter at the color sensor and the filter at the optical system, a plurality of types of spectral information can be obtained at once, while at the same time suppressing the number of filters at the main lens.

Figure 2A:
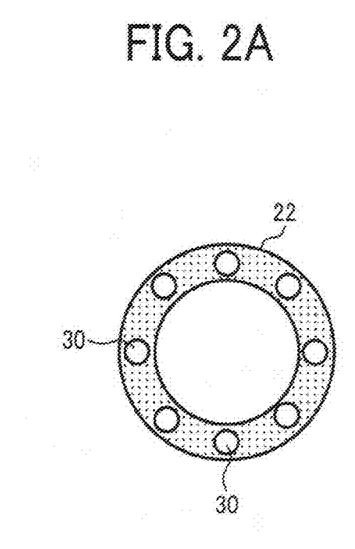
FIGS. 2A and 2B are a schematic diagram illustrating a structure of an image capturing system provided with an image capturing device according to an example embodiment of the present invention.
Figure 2B:
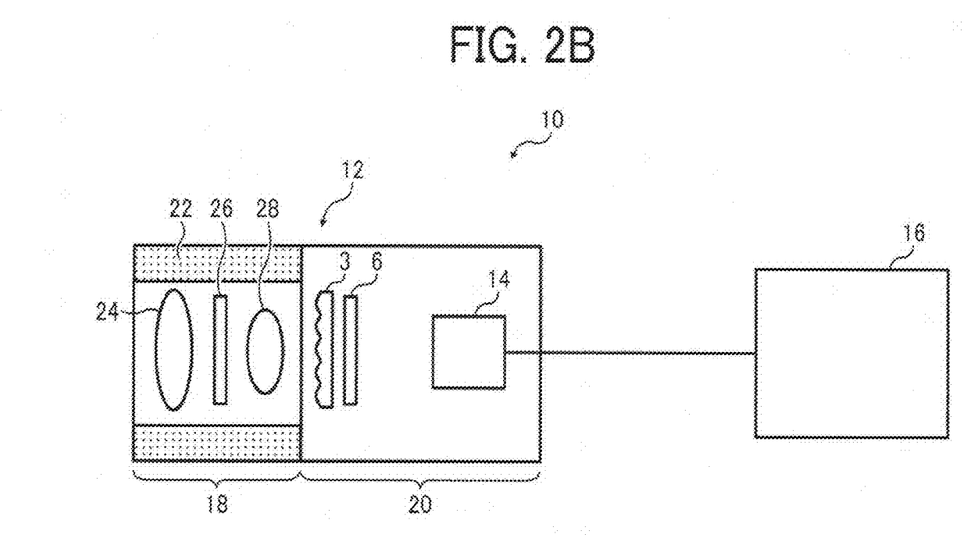

FIGS. 2A and 2B illustrate an image capturing system 10 according to an example embodiment of the present invention. Referring to FIG. 2B, the image capturing system 10 includes an image capturing device 12 that obtains spectral information from an object and generates a spectral image of a plurality of types based on the spectral information, and a spectrum calculator 16. The image capturing device 12 includes a field-programmable gate array (FPGA) 14, which generates a spectral image. The spectrum calculator 16 includes a central processing unit (CPU), a read only memory (ROM), and a random access memory (RAM). The spectrum calculator 16 calculates spectral reflectance of each pixel in the spectral image to estimate a spectrum of the object.

The image capturing device 12 mainly includes a lens module 18, and a camera 20 incorporating the FPGA 14 therein. Alternatively, the FPGA 14 may be provided outside the image capturing device 12.

The lens module 18 includes a lens tube 22, a main lens 24 functioning as an optical system within the lens tube 22, a first filter 26 provided near the diaphragm position of the main lens, and a lens 28. The camera 20 includes a MLA 3 functioning as a lens array, a color sensor 6, and the FPGA 14. In this example, a plurality of micro-lenses is arranged in a direction orthogonal to an optical axis of the main lens 24 to form the MLA 3.

As illustrated in FIG. 2A, at the edge of the lens tube 22, a plurality of LEDs 30 each functioning as a light source is embedded in the lens tube 22, in equal distance along the circumferential direction. With the LEDs 30, the image capturing device 12 is able to obtain spectral information, without being influenced by environmental conditions.

Figure 3:
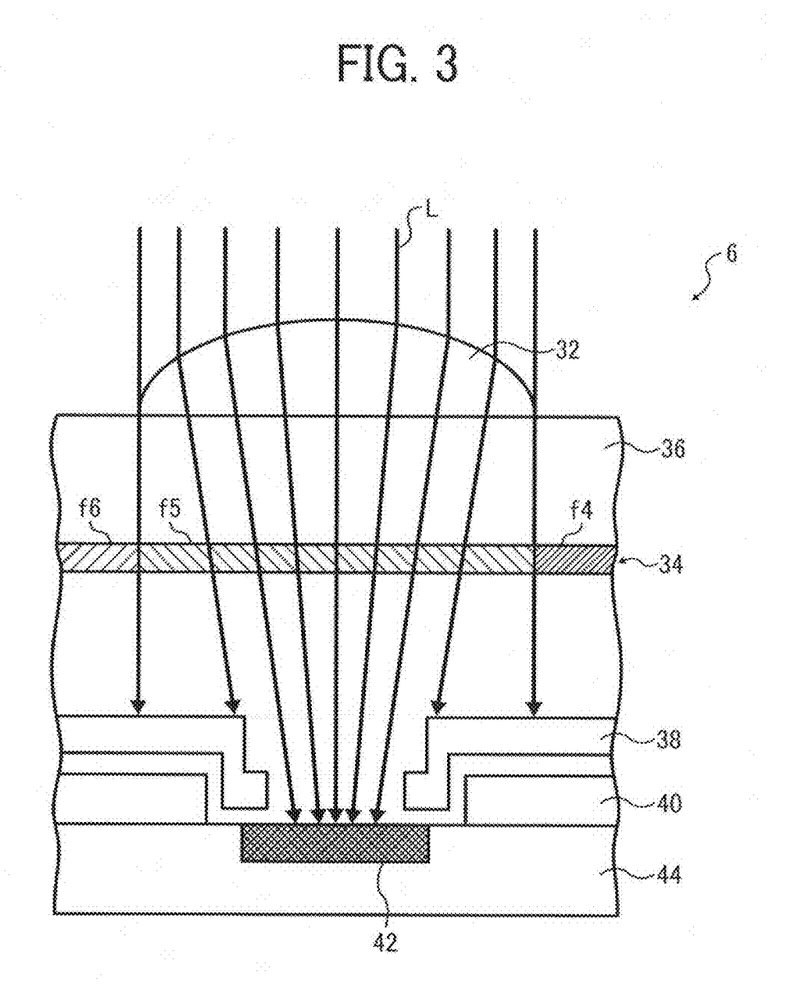
FIG. 3 is a cross-sectional view illustrating an enlarged portion of a color sensor of the image capturing device of FIGS. 2A and 2B.

FIG. 3 illustrates a cross-sectional view of the color sensor 6 of the image capturing device 12. The color sensor 6 includes a light receiving element, and a plurality of filters having different spectral characteristics. In this example, the color sensor 6 may have a structure that is substantially similar to the structure of an on-chip color filter for a CCD/CMOS sensor, manufactured by Toppan Printing. More specifically, the color sensor 6 includes a micro-lens 32, a color filter 34, a planarization layer 36, a light shielding layer 38, an electrode 40, a phototransistor 42, and a silicon substrate 44.

On the color sensor 6, the micro-lens 32 is provided for each pixel, such that a collection of the micro-lenses 32 functions as a lens array at the sensor side.

In this example, the color filter 34 functions as a second filter having at least two different spectral characteristics. More specifically, in this example, the color filter 34 includes three filters f4, f5, and f6 having different spectral characteristics. For example, the color sensor 6 is implemented by a RGB color sensor having a Bayer layout in which color filters of red, green, and blue are provided for each pixel.

Figure 4:
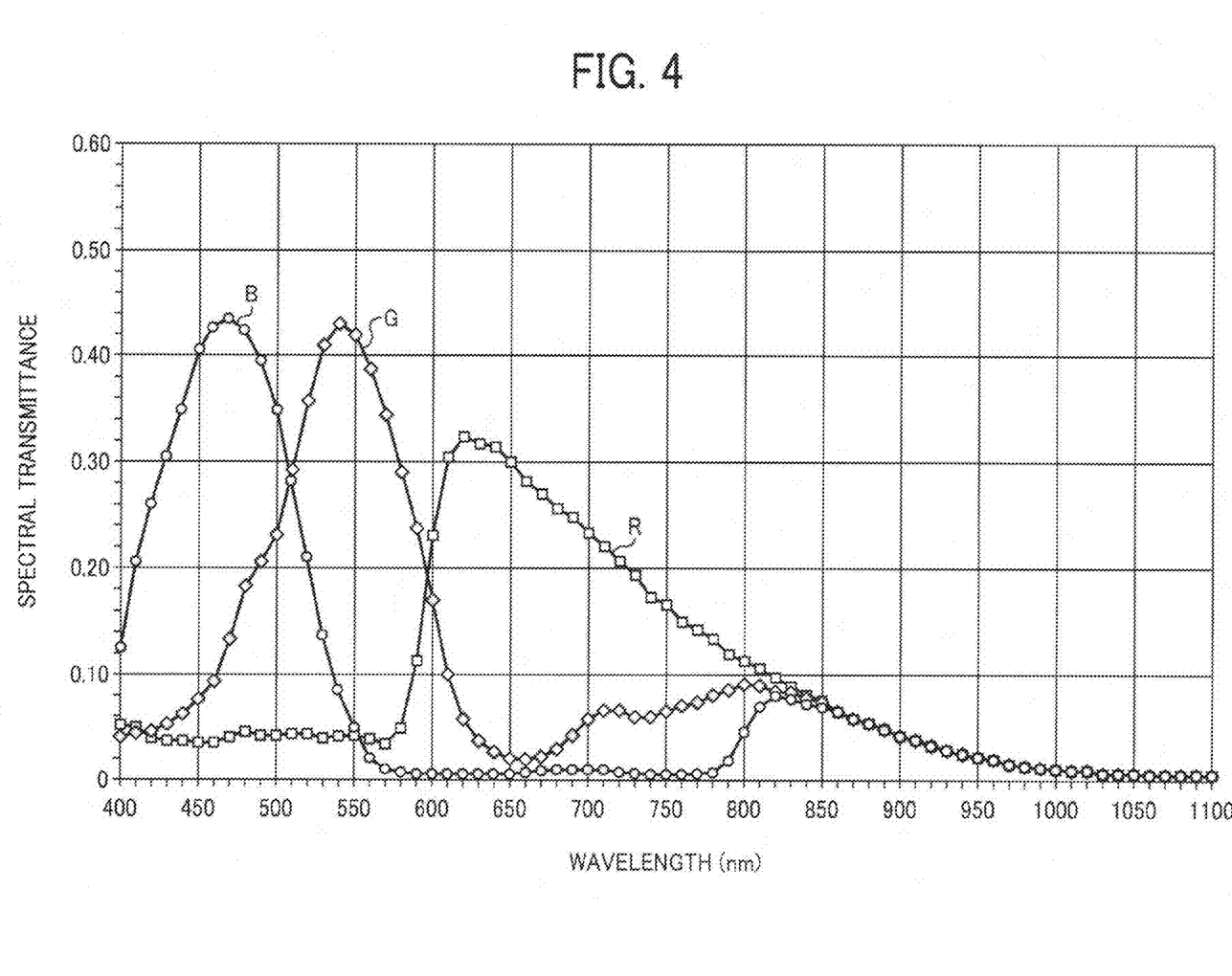
FIG. 4 is a graph illustrating the spectral characteristics of a general-purpose color sensor.

FIG. 4 illustrates the spectral characteristics of the general-purpose RGB color sensor. For the blue color, the spectrum has a peak around 470 nm. The spectrum for the green color has a peak around 540 nm. The spectrum for the red color has a peak around 620 nm. The curves of the spectral characteristics of those colors overlap at lower values of spectral transmittance. More specifically, the R spectrum and G spectrum overlap in the range between 520 to 650 nm, and the range between 700 and 800 nm. The G spectrum and the B spectrum overlap in the range between 420 and 510 nm.

Further, in this example, the ratio between the diameter of the micro-lens of the MLA 3, and the diameter of the micro-lens 32 of the color sensor 6 is about, from 30:1 to 10:1.

Figure 5:
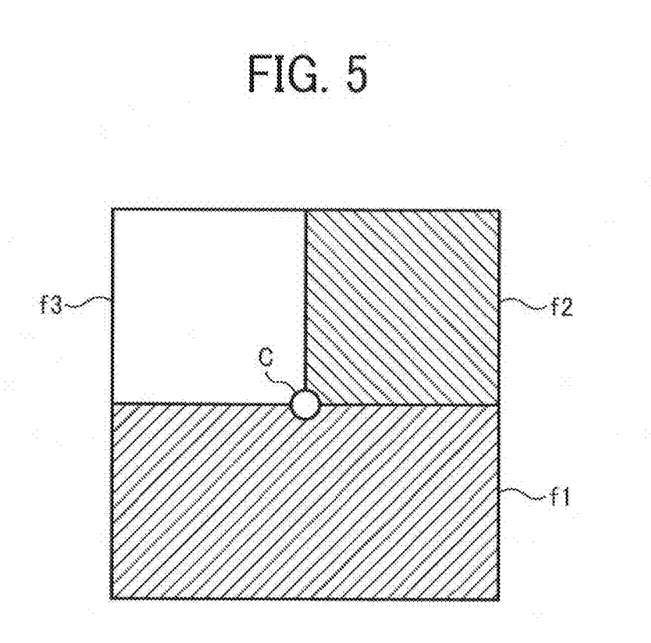
FIG. 5 is a front view illustrating the layout of a first filter of the image capturing device of FIGS. 2A and 2B.

FIG. 5 illustrates a front view of the first filter 26. The filters f1, f2, and f3 having different spectral characteristics are integrally formed, with plate glass that covers the filters. In this example, multi-layer films are evaporated on a surface of plate glass, such that one filter has three different types of spectral characteristics. Alternatively, three separate sheets of plate glass may be provided around the optical axis to form three different filters. Referring to FIG. 5, the first filter 26 is divided into three filters f1, f2, and f3, which are respectively positioned about the center of the main lens 24. This means that the first filter 26 has spectral characteristics, which changes about the center of the optical axis of the main lens 24.

Figure 6:
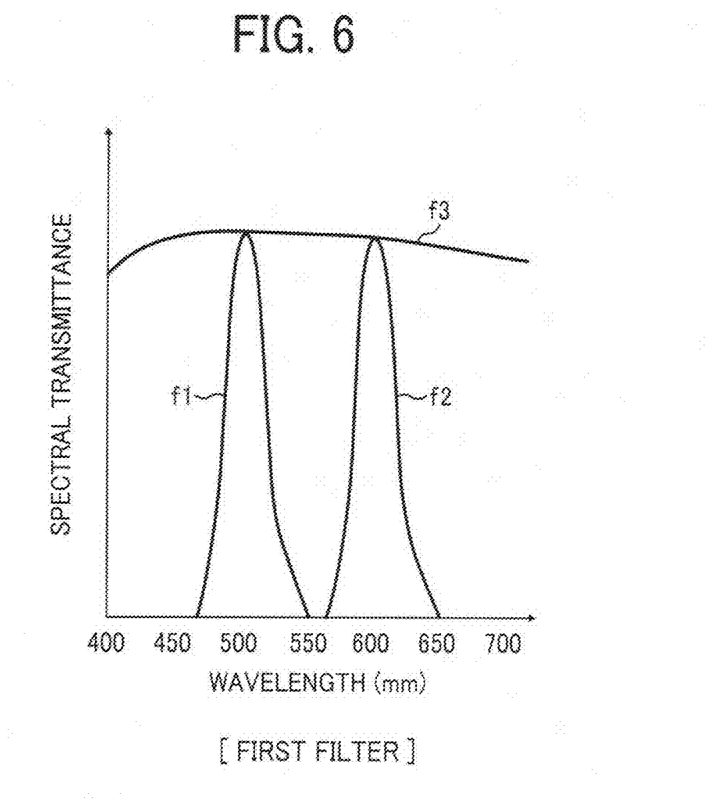
FIG. 6 is a graph illustrating the relationship between the wavelength and the spectral transmittance of the first filter of FIG. 5.
Figure 7:
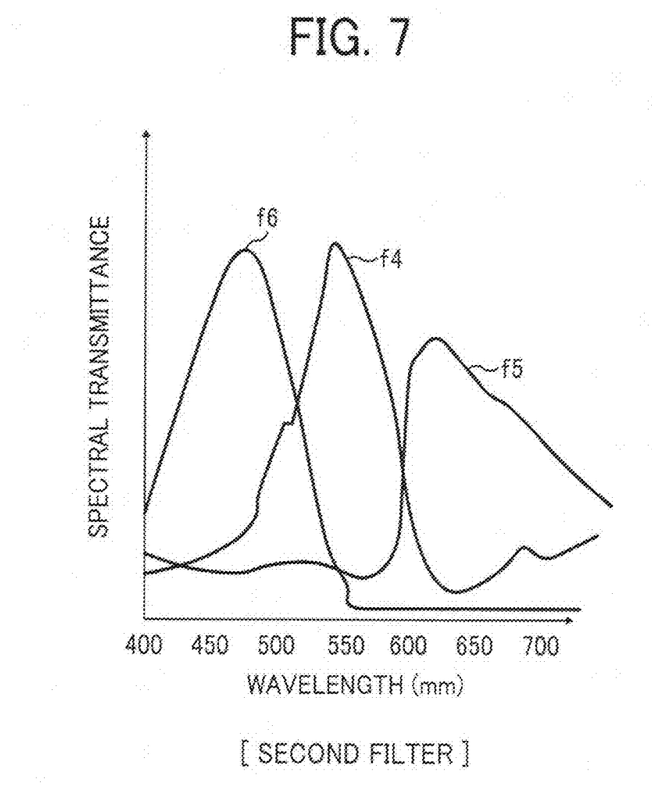
FIG. 7 is a graph illustrating the relationship between the wavelength and the spectral transmittance of a second filter provided at the color sensor of FIG. 3.

FIG. 6 illustrates spectral characteristics of the filters f1, f2, and f3 in the first filter 26. FIG. 7 illustrates spectral characteristics of the filters f4, f5, and f6 of the color filter 34 in the color sensor 6.

Of three types of filters in the first filter 26, the filter f1 and the filter f2 are each implemented by a band-pass filter having a peak in the visible range between 400 nm to 700 nm. The filter f3 is a through-pass filter having a peak throughout almost all values of visible range. The band-pass filter f1 has a peak wavelength value of 500 nm, which is a value between the peak values of the filters f6 and f4 of the color filter 34 ("second filter"). The band-pass filter f2 has a peak wavelength value of 600 nm, which is a value between the peak values of the filters f4 and f5 of the color filter 34.

More specifically, the filters f1, f2, and f3 of the first filter 26, and the filters f4, f5, and f6 of the second filter 34 (color sensor 6) respectively have different spectral characteristics. With this configuration, as the lights pass through nine different filters, that is, the three filters of the first filter 26 and the three filters of the second filter 34, spectral information of nine types (3×3=9) can be obtained. That is, nine patterns of combination of filters, (f1, f4), (f1, f5), (f1, f6), (f2, f4), (f2, f5), (f2, f6), (f3, f4), (f3, f5), and (f3, f6) are available to provide spectral information of a plurality of types, in a similar manner as nine different band-pass (through-pass) filters were provided at the first filter.

Figure 8A:
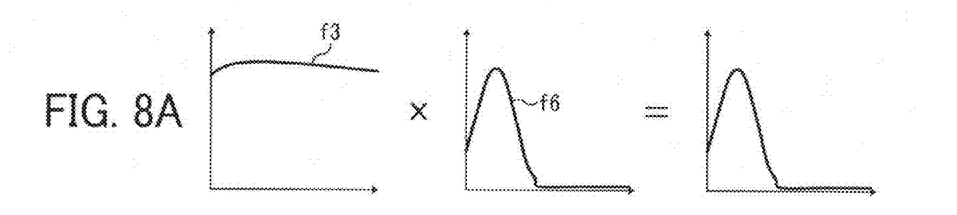
FIGS. 8A to 8F are an illustration for explaining a plurality of spectral patterns, each of which is generated by combining the spectral characteristics of the first filter and the spectral characteristics of the second filter.
Figure 8B:
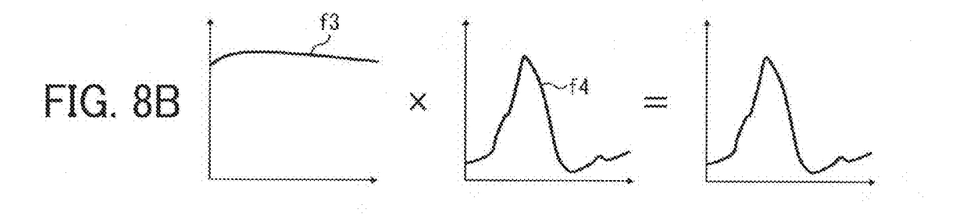
Figure 8C:
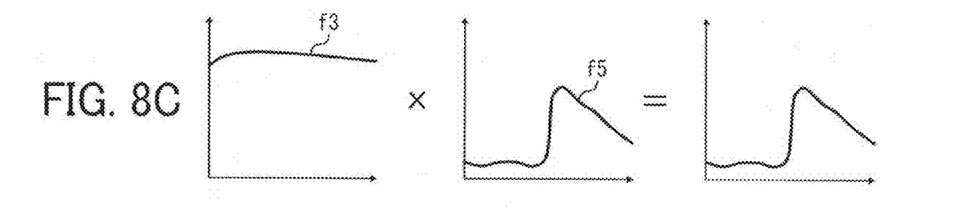
Figure 8D:
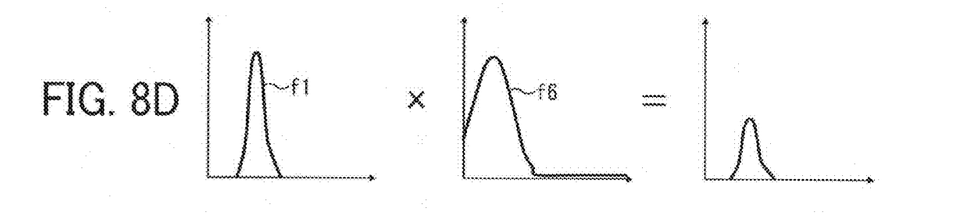
Figure 8E:
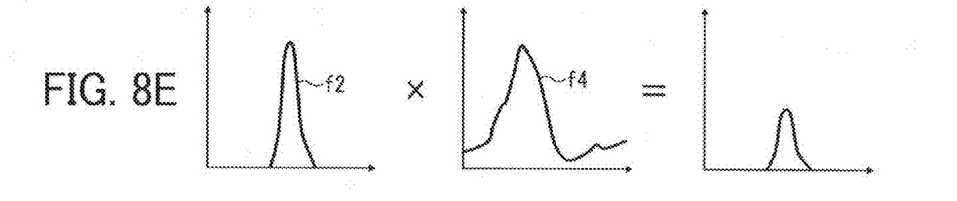
Figure 8F:
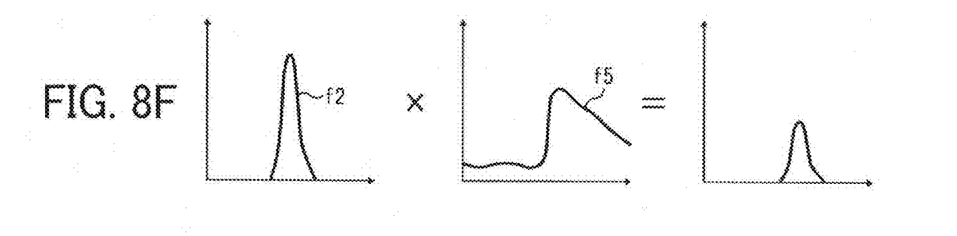

As the light can pass only through a spectral transmittance area of each filter, in this example, six types of spectral information are obtained as illustrated in FIGS. 8A to 8F. FIGS. 8A to 8C respectively indicate a combination of the through-pass filter f3, with the band-pass filter f6, band-pass filter f4, and the band-pass filter f5 of the second filter 34. FIG. 8D indicates a combination of the band-pass filter f1, with the band-pass filter f6 of the second filter 34. FIGS. 8E to 8F respectively indicate a combination of the band-pass filter f2, with the band-pass filter f4 and the band-pass filter f5 of the second filter 34.

Referring back to FIG. 2B, the FPGA 14 in the camera 20 arranges the captured images according to the spectral characteristics, to generate six types of spectral image. The spectrum calculator 16 calculates the spectrum of each pixel, based on six types of spectral image, obtained from the FPGA 14.

In order to estimate the spectrum based on the output results obtained from six combinations of filters, the spectrum calculator 16 may apply interpolation to the spectral distribution to smoothen the curve, using spline interpolation method or Lagrange interpolation method.

As described above, spectral characteristics of the first filter, and spectral characteristics of the second filter, which are respectively different, are provided so as to increase the number of types of spectral information that can be simultaneously obtained from an object, without increasing the number of filters provided near the diaphragm position of the optical system (main lens). In this example, at least six types of spectral information can be obtained, with a combination of three filters at the optical system and three filters at the sensor.

More specifically, an image capturing device is designed, such that spectral information from the object is distributed to the filters at the optical system (camera), and to the filters at the sensor, such that spectral information can be obtained by, not only by the filters at the sensor, but also using the filters at the optical system.

Accordingly, since the number of filters to be arranged at the diaphragm position does not have to be increased, the arrangement of each filter in the first filter does not have to be so much precise, thus suppressing the increase in manufacturing cost for an image capturing device capable of obtaining a multi-band, two-dimension spectral image. This further suppresses the problem in reduction in amount of receiving lights or lowering of resolution, which may be caused by the increased number of filters.

Generally, the amount of light that passes through the band-pass filter at the main lens or at the sensor, tends to be lower than that of light passing through the entire visible range via the through-pass filter. In this example, six types of spectral information are detected using one sensor. That is, a spectral image with higher light levels and a spectral image with lower light levels will be detected using one sensor, under the same exposure conditions, thus lowering the S/N ratio.

In view of this, as illustrated in FIG. 5, the band-pass filters f1 and f2 each have an effective area that is larger than an effective area of the through-pass filter f3. With this configuration, the spectral image with higher light levels is detected in smaller areas, and the spectral image with lower light levels is detected in larger areas, thus increasing the S/N ratio. More specifically, in this example, an effective light transmittance area of the through-pass filter f3 is about 1/4 of an effective light transmittance area of the first filter 26. The band-pass filter f2 has an effective light transmittance area, which is about 1/4 of the effective light transmittance area of the first filter 26. The band-pass filter f1 has an effective light transmittance area, which is about 2/4 of the effective light transmittance area of the first filter 26.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

For example, in the above-described example, the first sensor and the second sensor respectively have a plurality of filters having different spectral characteristics. The filter may correspond to a filter or a filter area that may be a part of the filter.

What is claimed is:

1. An image capturing device, comprising:
    an optical system configured to focus light from an object to generate optical information;
    a first filter provided near a diaphragm position of the optical system, the first filter including a plurality of filters respectively having different spectral characteristics, wherein each of the filters of the first filter is arranged circumferentially about an optical axis of the optical system and shares a border with two other filters of the first filter;
    a sensor configured to convert the optical information of the object to electronic data, the sensor being provided with a second filter, the second filter including a plurality of filters respectively having different spectral characteristics, which are different than the spectral characteristics of the first filter; and
    a lens array provided between the optical system and the sensor and configured to have a plurality of lenses being arranged substantially parallel to a two-dimensional surface of the sensor,
    wherein the light from the object passes through the respective filters of the first filter and the respective filters of the second filter to simultaneously form a plurality of types of spectral images of the object on an image plane of the sensor; and
    at least one filter of the first filter is a band-pass filter that allows light to be transmitted through a peak value, the peak value being different from a peak value of each of the plurality of filters of the second filter.

2. The image capturing device of claim 1, wherein the second filter includes three filters each having spectral characteristics different from one another.

3. The image capturing device of claim 1, wherein the peak value of the at least one filter of the first filter is a value between a peak value of one filter of the second filter and a peak value of another filter of the second filter.

4. The image capturing device of claim 3, wherein at least one filter of the first filter is a through-pass filter that allows the light to be transmitted through an entire spectral transmittance area of the second filter.

5. The image capturing device of claim 4, wherein a surface area of the through-pass filter is smaller than a surface area of the band-pass filter.

6. The image capturing device of claim 1, wherein the plurality of filters of the first filter are unitarily formed.

7. The image capturing device of claim 1, wherein the plurality of filters of the first filter are integrally formed with one plate glass.

8. The image capturing device of claim 1, wherein the sensor is a color-sensor.

9. An image capturing system, comprising:
    the image capturing device of claim 1; and
    a spectrum calculator configured to calculate a spectrum for each pixel, using the plurality of types of spectral images obtained from the image capturing device.

10. The image capturing device of claim 1, wherein the first filter includes three filters, two of which are band-pass filters and one of which is a through-pass filter,
    the second filter includes three band-pass filters, and
    both of the band-pass filters in the first filter have a peak value that is between a corresponding set of peak values of the band-pass filters of the second filter.

11. The image capturing device according to claim 1, wherein
    the lens array is provided near a point at which light that has passed through the first filter is focused, and irradiates a different point of the second filter with light that has passed through one of the plurality of filters or an area of the first filter.

12. The image capturing device according to claim 1, wherein
    the first filter includes at least one through-pass filter, and the through-pass filter has an effective area equal to or smaller than an effective area of the band-pass filter.

13. The image capturing device according to claim 1, wherein
    the number of plurality of filters or a plurality of areas of the first filter is less than the number of types of spectral information obtained from the object.

14. The image capturing device of claim 1, wherein a transmission wavelength area of at least two of the plurality of filters of the first filter is narrower than the transmission wavelength area of any of the filters of the second filter.

15. The image capturing device of claim 1, wherein the second filter includes three filters each having a transmission wavelength peak different from one another,
    the three filters of the second filter have two areas where transmission wavelength areas overlap with each other among transmission wavelength peaks of the three filters, and
    the transmission wavelength peak of at least two of the plurality of filters of the first filter exists in each of the two areas where the transmission wavelength areas overlap with each other.

* * * * *